(12) United States Patent
Tanno et al.

(10) Patent No.: US 7,912,011 B2
(45) Date of Patent: Mar. 22, 2011

(54) RADIO COMMUNICATION SYSTEM, BASE STATION, MOBILE STATION AND WIRELESS COMMUNICATION METHOD

(75) Inventors: Motohiro Tanno, Yokohama (JP); Kenichi Higuchi, Yokohama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 229 days.

(21) Appl. No.: 11/909,791

(22) PCT Filed: Mar. 24, 2006

(86) PCT No.: PCT/JP2006/306032
§ 371 (c)(1),
(2), (4) Date: Dec. 9, 2008

(87) PCT Pub. No.: WO2006/109538
PCT Pub. Date: Oct. 19, 2006

(65) Prior Publication Data
US 2009/0149169 A1      Jun. 11, 2009

(30) Foreign Application Priority Data
Mar. 31, 2005   (JP) .................................. 2005-105497

(51) Int. Cl.
*H04Q 7/00* (2006.01)
(52) U.S. Cl. ........................................ 370/331; 455/442
(58) Field of Classification Search .......... 370/328–334, 370/338; 455/436–442
See application file for complete search history.

(56) References Cited

U.S. PATENT DOCUMENTS

| | | | |
|---|---|---|---|
| 6,526,039 B1 * | 2/2003 | Dahlman et al. | 370/350 |
| 2003/0081571 A1 * | 5/2003 | Hur | 370/331 |
| 2004/0202119 A1 * | 10/2004 | Edge | 370/324 |
| 2005/0259615 A1 | 11/2005 | Chung | |

FOREIGN PATENT DOCUMENTS

| | | |
|---|---|---|
| CN | 1296679 A | 5/2001 |
| JP | 2002-503913 A | 2/2002 |
| JP | 2002-124906 A | 4/2002 |
| TW | 567686 | 12/2003 |

OTHER PUBLICATIONS

Taiwanese Office Action for Taiwanese Application No. 095110730, mailed on Oct. 5, 2007 (5 pages).
esp@cenet patent abstract for Taiwanese Publication No. 567686, Publication date Dec. 21, 2003 (1 page).

(Continued)

*Primary Examiner* — Ricky Ngo
*Assistant Examiner* — Pao Sinkantarakorn
(74) *Attorney, Agent, or Firm* — Osha Liang LLP

(57) ABSTRACT

In a radio communication system including a plurality of base stations and a plurality of mobile stations, a base station includes a reception timing difference report unit measuring a reception timing difference of reference signals transmitted from neighboring base stations, and reporting the reception timing difference to one or more base stations. A base station has a transmission timing difference computation unit computing a transmission timing difference of reference signals between the base station and neighboring base stations based on the reception timing difference, and a transmission timing difference information report unit reporting the transmission timing difference to the mobile station. The mobile station further includes a cell search unit performing cell search on a cell search range limited based on the transmission timing difference transmitted from the base station.

6 Claims, 12 Drawing Sheets

OTHER PUBLICATIONS

Chinese Office Action for Application No 200680013616.6, mailed on Sep. 2, 2010 (11 pages).

esp@cenet Patent Abstract for Chinese Publication No. 1296679, publication date May 23, 2001 (1 page).

Kenichi Higuchi, et al., "Fast Cell Search Algorithm using Long Code Masking in DS-CDMA Asynchronous Cellular System," The Institute of Electronics, Information and Communication Engineers, Technical Report of IEICE, DSP96-116, SAT96-111, RCS96-122, pp. 57-63, Jan. 1997, 7 pages.

Yukiko Hanada, et al., "3-Step Cell Search Performance using frequency-multiplexed SCH for Broadband Multi-carrier DCMA Wireless Access," The Institute of Electronics, Information and Communication Engineers, Technical Report of IEICE, NS2001-90, RCS2001-91, pp. 73-78, Jul. 2001, 6 pages.

Motohiro Tanno, et al., "Three-Step Fast Cell Search Algorithm Utilizing Common Pilot Channel for Forward Link Broadband OFCDM Packet Wireless Acess," The Institute of Electronics, Information and Communication Engineers, Technical Report of IEICE, NS2002-40, CQ2002-40, pp. 135-140, Apr. 2002, 6 pages.

International Search Report issued in PCT/JP2006/306032 dated Jul. 4, 2006, with English translation, 2 pages.

* cited by examiner

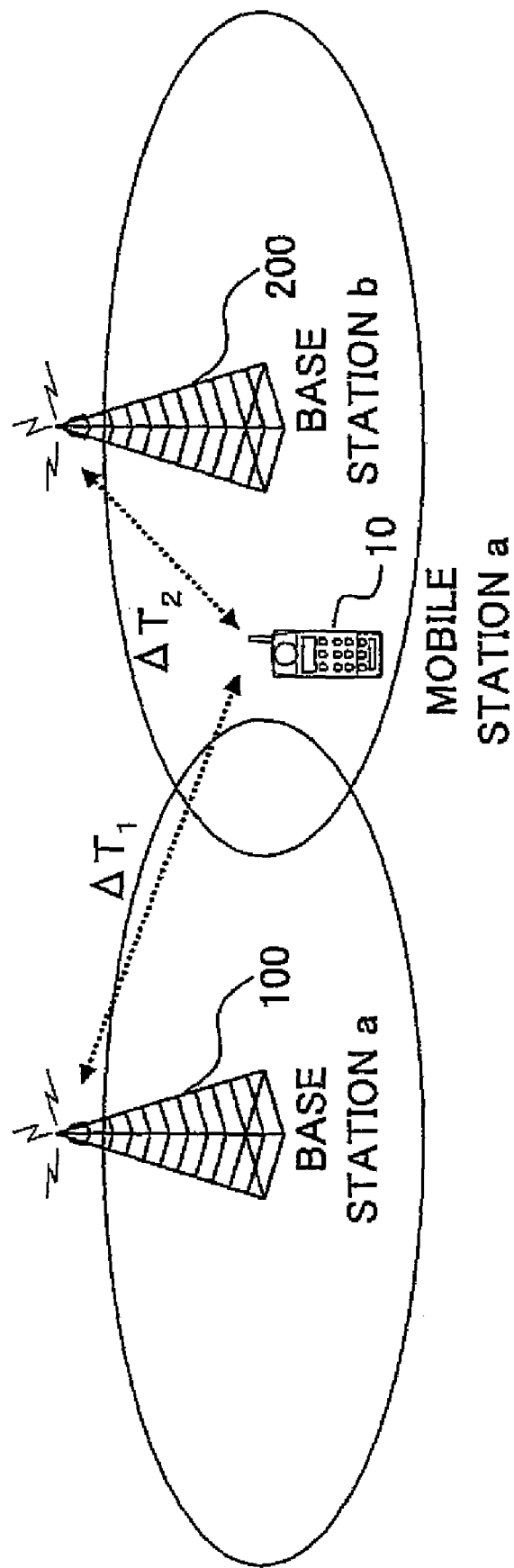

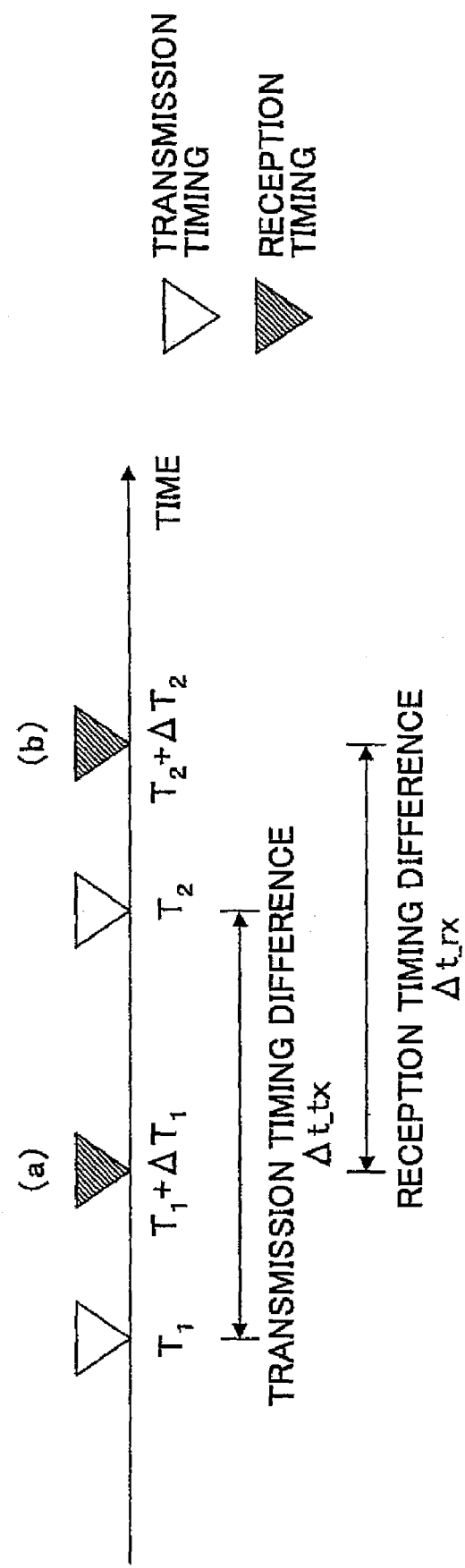

RADIO COMMUNICATION SYSTEM, BASE STATION, MOBILE STATION AND WIRELESS COMMUNICATION METHOD

TECHNICAL FIELD

The present invention relates to a radio communication system, a base station, a mobile station and a radio communication method.

BACKGROUND ART

In a radio communication system such as a mobile communication system, a mobile station performs a cell search for a cell to be connected to by a radio link (for identifying a base station) at the start time of communications, at handover time and at communication stand-by time for periodic reception.

A mobile station operates with the use of power supplied from a battery. Thus, if it takes a large amount of time to complete the cell search, the problem of more current consumption may arise.

The W-CDMA scheme was adopted for use in mobile communication systems in IMT-2000 (International Mobile Telecommunications 2000); hence, a 3-step cell search method is proposed to reduce the time involved in the cell search. For example, see non-patent document 1. According to this proposed method, the scrambling code in a downlink control channel is masked, and correlation detection is performed on the masked portion by using a spreading code common to different cells. Thus, detection of timing and the type of scrambling code is achieved, resulting in reduced cell search time.

Some techniques of reporting neighboring station scrambling codes as report information transmitted from a radio base station are disclosed for reducing current consumed in a CDMA type mobile device and improving the duration of the stand-by mode. See patent document 1, for example.

In the fourth generation mobile communication system, which is the next generation system of IMT-2000, on the other hand, the VSF-OFCDM (Variable Spreading Factor Orthogonal Frequency and Code Division Multiplexing) scheme has been researched and developed as a radio access scheme achieving a maximum throughput of higher than or equal to 100 Mbps on the downlink from a cell environment to an isolated cell environment such as a hot spot.

As for OFCDM scheme cell search methods in a downlink, some method of dividing into a frame timing detection process and a scrambling code identification process by means of a frequency multiplexing type synchronization channel (SCH) to achieve faster initial cell search (for example, see non-patent document 2), a 3-step cell search using only a common pilot channel (CPICH) without use of the SCH (for example, see non-patent document 3), and other methods have been proposed.

Patent document 1: Japan Laid-open Publication No. 2002-124906
Non-patent document 1: Higuchi, Sawahashi, Adachi et al. "Fast Cell Search Method with Longcode Mask in DS-CDMA Inter-Base Stations Asynchronization Cellular", (Shingakugiho RCS 96-122, January, 1997)
Non-patent document 2: Hanada, Shin, Higuchi, and Sawahashi, "3-Step Cell Search Characteristic with Frequency Multiplexing Synchronization Channel in Broadband Multicarrier CDMA Transmission", (Shingakugiho RCS 2001-91, July, 2001)
Non-patent document 3: Tanno, Shin, Higuchi, and Sawahashi, "3-Step Fast Cell Search Method with Pilot Channel in Downlink Broadband OFCDM", (Shingakugiho RCS 2002-40, April, 2002)

DISCLOSURE OF INVENTION

Problem to be Solved by the Invention

In the above-mentioned W-CDMA scheme, an inter-base station asynchronization system operating a plurality of base stations in an asynchronous manner (i.e. individual signals from base stations are transmitted without synchronization of the signals with each other) is adopted. Also in the OFCDM scheme, adoption of an inter-base station asynchronization system is being considered.

In an inter-base station asynchronization system, since each base station operates at arbitrary timing independent of other base stations, a mobile station has to compute correlation values at the number of times equal to (the number $N_{ft}$ of candidate timings×the number $N_{cr}$ of candidate (cell-specific) scramble codes) and select the maximum timing and scramble code. In other words, since all candidate timings have to be correlated, there may arise a problem that the cell search leads to a significant increase in the computational complexity and more time for the cell search is required.

In the above-mentioned 3-step cell search, a frame is divided into several slots, and the frame timing is derived after detection of the slot timing. Thus, it achieves reduction in the computational amount associated with cell search compared to the case where all candidate timings are correlated. However, in detection of the slot timing, for example, there are 2,560 (×oversamplings) candidate timings in the W-CDMA scheme, and thus a larger computational amount and a longer cell search results in increases in consumed power.

Also in the OFCDM scheme, which is being considered as the radio access scheme for the fourth generation mobile communication systems, it is contemplated that the number $N_{ft}$ of candidate timings is approximately equal to that in W-CDMA scheme (as stated below). Thus, even if the 3-step cell search method is adopted in the OFCDM scheme, the problem of increase in computational time for cell search and in consumed power like the W-CDMA scheme may arise.

The present invention aims to eliminate the above-mentioned problem, and one object of the present invention provides a radio communication system, a base station, a mobile station and a radio communication method achieving less cell search time and less power consumed in a mobile station.

Means for Solving the Problem

In order to solve the problem, the present invention relates to a radio communication system including a plurality of base station and a plurality of mobile stations, the mobile stations including a reception timing difference unit receiving reference signals transmitted from neighboring base stations, measuring a reception timing difference between the reference signals, and reporting the reception timing difference to one or more of the base stations, the base stations including a transmission timing difference unit and a transmission timing difference information report unit, the transmission timing difference unit computing a transmission timing difference of the reference signals between own base station and the neighboring base stations based on the reception timing difference reported from the mobile stations, the transmission timing difference information report unit reporting the transmission timing difference computed by the transmission timing difference computation unit to the mobile stations, the mobile stations further including a cell search unit performing cell search on a cell search range limited based on the transmission timing difference reported from the base stations.

Furthermore, according to an embodiment of the present invention, in the radio communication system, the base station may further include a scramble code report unit reporting a scramble code of a neighboring base station in the reporting of the transmission timing difference to the mobile station, the cell search unit of the mobile station performing cell search on a cell search range limited based on the transmission timing difference reported from the base station and the scramble code of the neighboring base stations.

Also, the present invention relates to a base station for communicating to a plurality of mobile stations, comprising: a transmission timing difference computation unit receiving a reception timing difference of reference signals between neighboring base stations from the mobile stations, and computing a transmission timing difference of reference signals between own base station and the neighboring base stations based on the received reception timing difference; and a transmission timing difference information report unit reporting the transmission timing difference computed by the transmission timing difference computation unit to the mobile stations.

Furthermore, according to an embodiment of the present invention, the base station may further include: a reception timing information acquisition unit acquiring reception timing differences of reference signals of neighboring base stations from the mobile stations, the transmission timing difference computation unit including a statistical operation unit performing a statistical operation on the reception timing differences acquired by the reception timing information acquisition unit.

Still furthermore, according to an embodiment of the present invention, in the base station, the statistical operation may include an averaging operation on the reception timing differences.

Still furthermore, according to an embodiment of the present invention, the base station may further include: a reception timing difference measurement unit transmitting a control signal to cause the mobile stations to measure the reception timing differences of the neighboring base stations reference signals.

Also, the present invention relates to a mobile station wirelessly connected to a base station, comprising: a reception timing difference report unit receiving reference signals transmitted from neighboring base stations, measuring a reception timing difference between the reference signals, and reporting the reception timing difference to one or more base stations; and a cell search unit performing cell search on a cell search range limited based on the transmission timing difference transmitted from the base stations.

Furthermore, according to an embodiment of the present invention, in the mobile station, the cell search unit may perform cell search on a cell search range limited based on the transmission timing difference reported from the base stations and a scramble code of a neighboring base station.

Still furthermore, according to an embodiment of the present invention, in the mobile station, the cell search unit may include a limit unit limiting the cell search range by limiting the number of candidate timings based on the transmission timing difference and the number of candidate scramble codes based on the scramble code of the neighboring base station.

Advantage of the Invention

According to the embodiments of the present invention, a base station computes a transmission timing difference of reference signals between the base station and neighboring base stations based on reception timing differences of the reference signals between the base stations measured at and reported from a mobile station, and reports the transmission timing difference to the mobile station. The mobile station can limit a cell search range as much as possible, resulting in reduction of cell search time. In other words, according to the embodiments of the present invention, it is possible to reduce power consumed at a mobile station during stand-by mode and accordingly provide the advantage of longer duration of the stand-by mode.

BRIEF DESCRIPTION OF DRAWINGS

FIG. 2A is a diagram to explain an exemplary general operation of an embodiment of the present invention;

FIG. 2B is a diagram to explain an exemplary general operation of an embodiment of the present invention;

| LIST OF REFERENCE SYMBOLS | |
|---|---|
| 1: | radio communication system |
| 10, 20, 30: | mobile stations a-c |
| 51: | common pilot channel reception timing difference measurement unit |
| 52: | uplink control information generation unit |
| 53: | uplink control channel transmission unit |
| 61: | uplink channel reception unit |
| 62: | transmission timing computation unit |
| 63: | report information generation unit |
| 64: | broadcast control channel transmission unit |
| 71: | downlink broadcast control channel reception unit |
| 72: | candidate frame timing reduction unit |
| 73: | frame timing detection unit (cell search unit) |
| 81: | reception timing information acquisition unit |
| 91: | mobile station location measurement unit |
| 100: | base station a |
| 200: | base station b |

BEST MODE FOR CARRYING OUT THE INVENTION

In the following, embodiments of the present invention will be described with reference to the accompanying drawings.

First Embodiment

Figure 1:
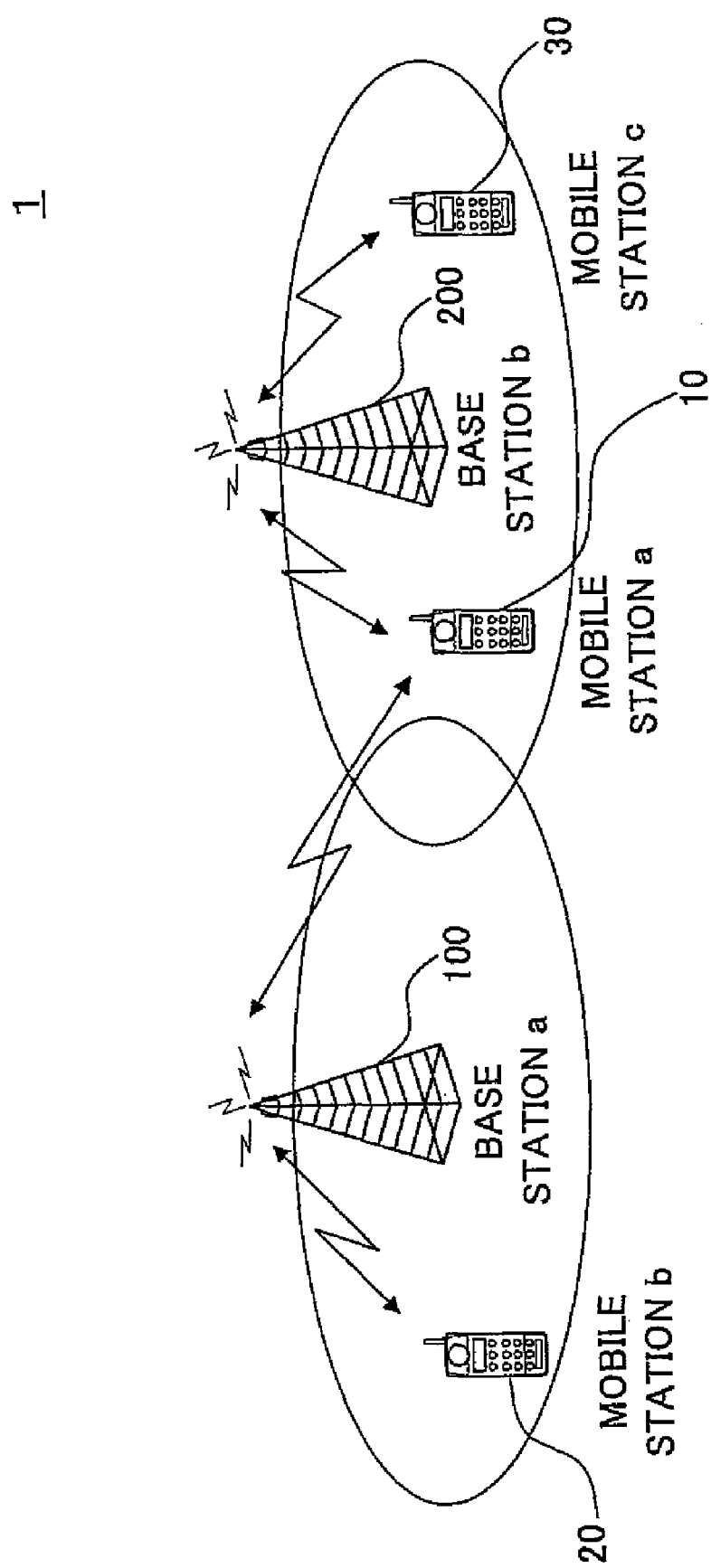
FIG. 1 is a diagram illustrating an exemplary configuration of a radio communication system according to a first embodiment of the present invention.

A radio communication system according to a first embodiment of the present invention is configured as illustrated in FIG. 1. In this illustration, the radio communication system 1, which may be configured as a mobile communication system, comprises a plurality of base stations (base station a (100) and base station b (200) covering certain radio zones, and a plurality of mobile stations a-c (10-30) establishing radio channels between the base stations and themselves for communications. In this embodiment, the base stations wirelessly communicate to the mobile stations in accordance with a CDMA scheme or multicarrier scheme.

First, an exemplary general operation according to an embodiment of the present invention is described with reference to FIGS. 2A and 2B. FIGS. 2A and 2B are diagrams to explain general operations according to embodiments of the present invention.

In these illustrations, a mobile station a (10) performs cell search for a target cell (base station) to establish connections to the base stations a (100) and b (200) and carry out handover.

In an embodiment of the present invention, the mobile station a (10) measures a reception timing difference between common pilot channel signals (reference signals) with a known pattern always transmitted from the base stations a (100) and b (200) and then reports the measurement result to the base stations a (100) and b (200). Since the distance between the mobile station a (10) and the base station a (100) differs from the distance between the mobile station a (10) and the base station b (200), the propagation delay differs accordingly. For example, the reception timing difference measured at the mobile station a (10) corresponds to the timing difference ($\Delta t\_rx$) between the reception timing (a) with reception delay $\Delta T_1$ relative to the transmission timing $T_1$ of a common pilot channel signal transmitted from the base station a (100) and the reception timing (b) with reception delay $\Delta T_2$ relative to the transmission timing $T_2$ of a common pilot channel signal transmitted from the base station b (200).

The reception timing difference ($\Delta t\_rx$) measured at the mobile station a (10) in the above-mentioned manner is reported as reception timing difference information to the base station a (100). In this embodiment, it is supposed that the reception timing difference information is reported to the base station a (100), and the subsequent description is focused on operation of the base station a (100).

The base station a (100) derives the transmission timing difference between the base station a (100) and an adjacent base station (in this embodiment, the base station b (200)) based on the reception timing difference information received from the mobile station a (10). Since the transmission timing ($T_1$) of a common pilot channel signal at the base station a (100) is known to the base station a (100), it is estimated that the timing ($T_1+\Delta t\_rx$) with the delay ($\Delta t\_rx$), that is, the reception timing difference, from the known transmission timing $T_1$ may be the transmission timing ($T_2$) of a common pilot channel signal transmitted from the base station b (200).

After estimation of the transmission timing $T_2$ of a common pilot channel signal transmitted from the base station b (200) in the above-mentioned manner, the base station a (100) derives the transmission timing difference ($\Delta t\_tx=T_2-T_1$) of a common pilot channel signal between the base station a (100) and the base station b (200).

The transmission timing difference derived in this manner is reported as transmission timing difference information from the base station a (100) to the mobile station a (10) The mobile station a (10) performs cell search within some limited cell search range based on the transmission timing difference, which is received from the base station a (100), of a common pilot channel signal between the base stations (the base stations a-b (100,200)). This cell search is described in detail below.

Figure 3:
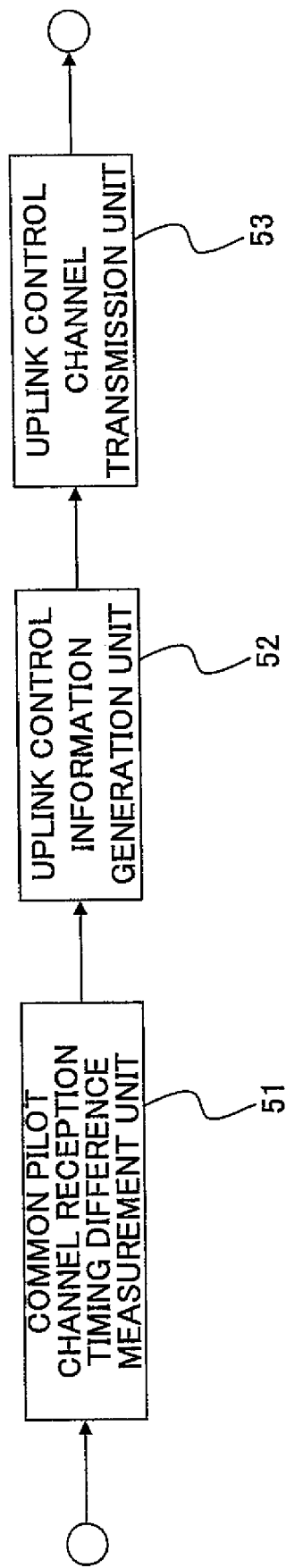
FIG. 3 is a block diagram illustrating an exemplary configuration of a mobile station according to the first embodiment.

Then, the configuration of a mobile station according to an embodiment of the present invention is described. FIG. 3 is a block diagram illustrating an exemplary configuration of a mobile station (ex. mobile station a (10)) according to the first embodiment of the present invention.

In this illustration, the mobile station comprises a common pilot channel reception timing difference measurement unit 51, an uplink control information generation unit 52, and an uplink control channel transmission unit 53.

The common pilot channel reception timing difference measurement unit 51 includes a common pilot channel correlation device, detects correlation of common pilot channel signals of base stations to be searched, and measures reception timing differences between the common pilot channel signals transmitted from the base stations.

The uplink control information generation unit 52 generates information on the reception timing differences measured at the common pilot channel reception timing difference measurement unit 51 as control information for reporting to the base stations. The uplink control channel transmission unit 53 transmits the generated control information to the base stations over the uplink control channel.

Figure 4:
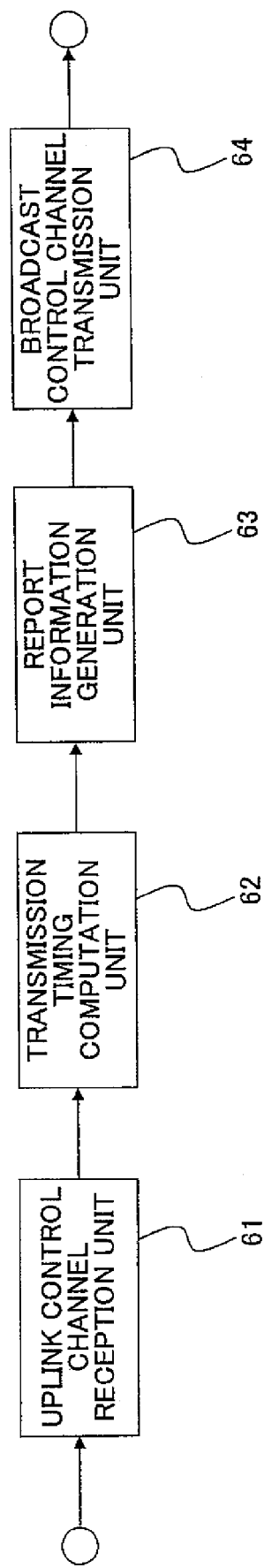
FIG. 4 is a block diagram illustrating an exemplary configuration of a base station according to the first embodiment.

Next, the configuration of a base station according to this embodiment is described. FIG. 4 is a block diagram illustrating an exemplary configuration of a base station (ex. the base station a (100)) according to the first embodiment of the present invention.

In this illustration, the base station comprises an uplink control channel reception unit 61, a transmission timing computation unit 62, a report information generation unit 63 and a broadcast control channel transmission unit 64.

The uplink control channel reception unit 61 receives reception timing difference information transmitted from a mobile station over an uplink control channel, and supplies the received reception timing difference information to the transmission timing computation unit 62. The transmission timing computation unit 62 computes transmission timing (transmission timing difference) of a common pilot channel from the base station and an adjacent base station. The report information generation unit 63 generates information for transmitting the transmission timing difference information on the common pilot channel computed in the transmission timing computation unit 62 over a broadcast control channel. The broadcast control channel transmission unit 64 transmits the generated transmission timing difference information over the broadcast control channel.

Figure 5:
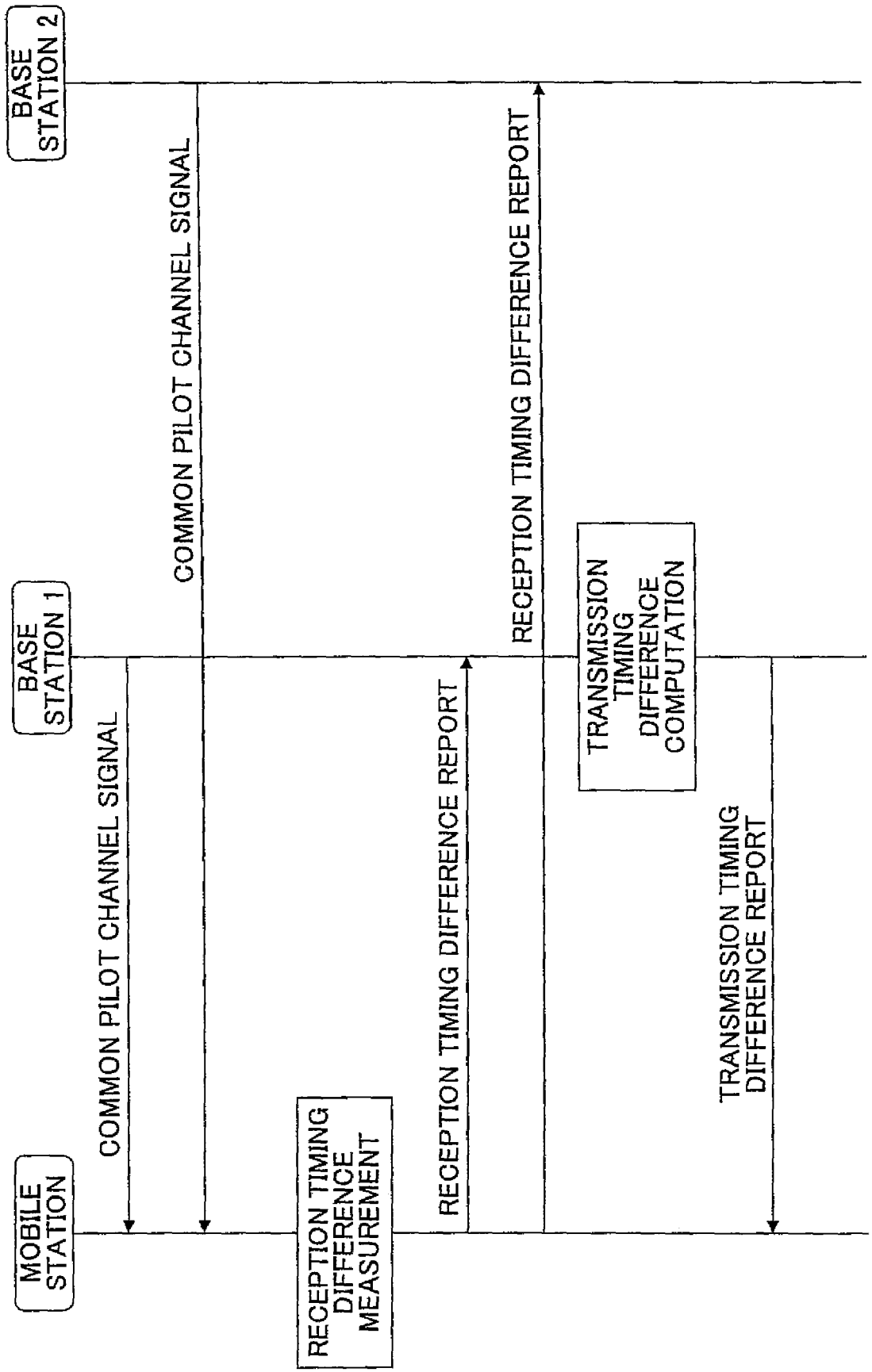
FIG. 5 is a sequence diagram illustrating an exemplary flow of control operations between a mobile station and a base station.

FIG. 5 is a control sequence diagram illustrating exemplary flow of control operations up to reporting of the transmission timing difference to a mobile station between the mobile station and a base station as configured above. A subsequent description is continued with reference to this illustration.

In this illustration, base stations 1 and 2 transmit common pilot channel signals to mobile stations. A mobile station receives common pilot channel signals transmitted from different base stations, and measures reception timing differences of the common pilot channel signals. Then, the measurement results are reported as reception timing difference information to the respective base stations. In this description, operation of the base station 1 is focused on. The base station 1 computes a transmission timing difference based on the reception timing difference information transmitted from a mobile station, and transmits information indicative of the computation result including the broadcast control channel to the mobile station. The mobile station performs cell search within a limited search range based on the transmission timing difference information transmitted from the base station 1. Then, this cell search is described in detail.

Figure 6:
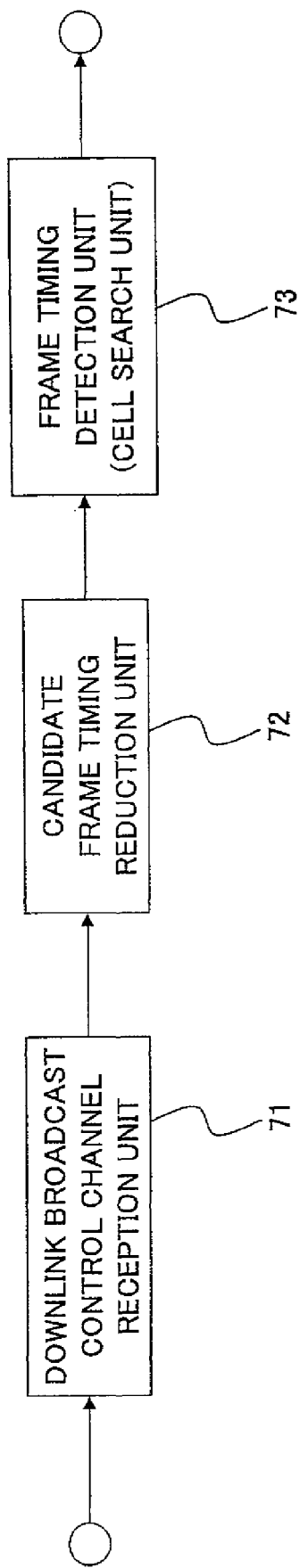
FIG. 6 is a block diagram illustrating an exemplary configuration of a cell search unit in a mobile station according to the first embodiment.

FIG. 6 is a block diagram illustrating an exemplary configuration around a cell search unit of a mobile station.

In this illustration, a downlink broadcast control channel reception unit 71 and a candidate frame timing reduction unit 72 are provided around a cell search unit (frame timing detection unit) 73.

The downlink broadcast control channel reception unit 71 receives a broadcast control channel transmitted from a base station. This broadcast control channel includes transmission timing difference information, and preferably includes frame timing difference information.

The candidate frame timing reduction unit 72 limits a cell search range by using the frame timing difference information reported via the downlink report information to reduce the number of candidate frame timings. The frame timing detection unit 73 detects the boundary between candidate frames, that is, the start timing of the frames (frame timing) under the number of candidate frame timings reduced in the candidate frame timing reduction unit 72. In this embodiment, if the number of candidate frame timings is reduced to $N_{ft}'$, the computation amount for detecting frame timing for cell search would become equal to $N_{ft}'/N_{ft}$.

Meanwhile, in the W-CDMA scheme, the number of candidate frame timings becomes equal to 38,400 (usually being multiples of this value for oversampling), which is the number of chips per slot within one frame of 10 ms.

On the other hand, in OFCDM, which is being considered as the radio access scheme for the fourth generation mobile communication systems, one frame is short, for example, one frame has about 0.5 ms. However, since (higher time resolution) broadband signals of about 100 MHz are used, the number of candidate frame timings would become equivalent to the W-CDMA scheme.

Also, the frame timing detection unit 73, if scramble codes for neighboring stations are reported in downlink report information, does not detect correlation for all the scramble codes prepared in the system, but performs correlation detection on reported candidate scramble codes and detects scramble codes multiplied with signals for base stations to be connected.

In a system that uses cell specific scramble codes, as represented by the CDMA scheme, to randomize other-cell interference and implement one cell frequency reuse, in conjunction with the number of candidate scramble codes, more than several hundred scramble codes are defined in the system, resulting in almost free assignment of scramble codes. In the W-CDMA scheme, 612 types of scramble codes are defined. In OFCDM, which is being considered as the radio access scheme for the fourth generation mobile communication systems, the number of candidate scramble codes would become almost equal to the W-CDMA scheme.

Figure 7:
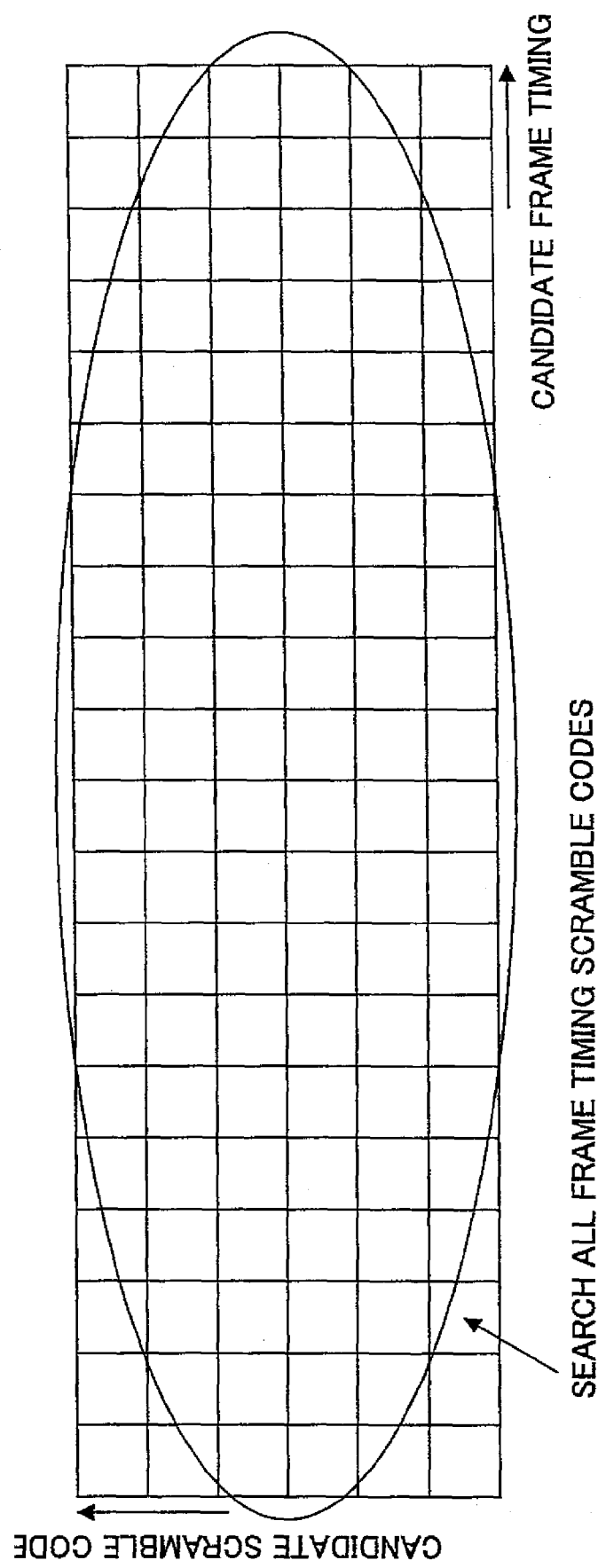
FIG. 7 is a schematic diagram illustrating a search range in a conventional cell search method.
Figure 8:
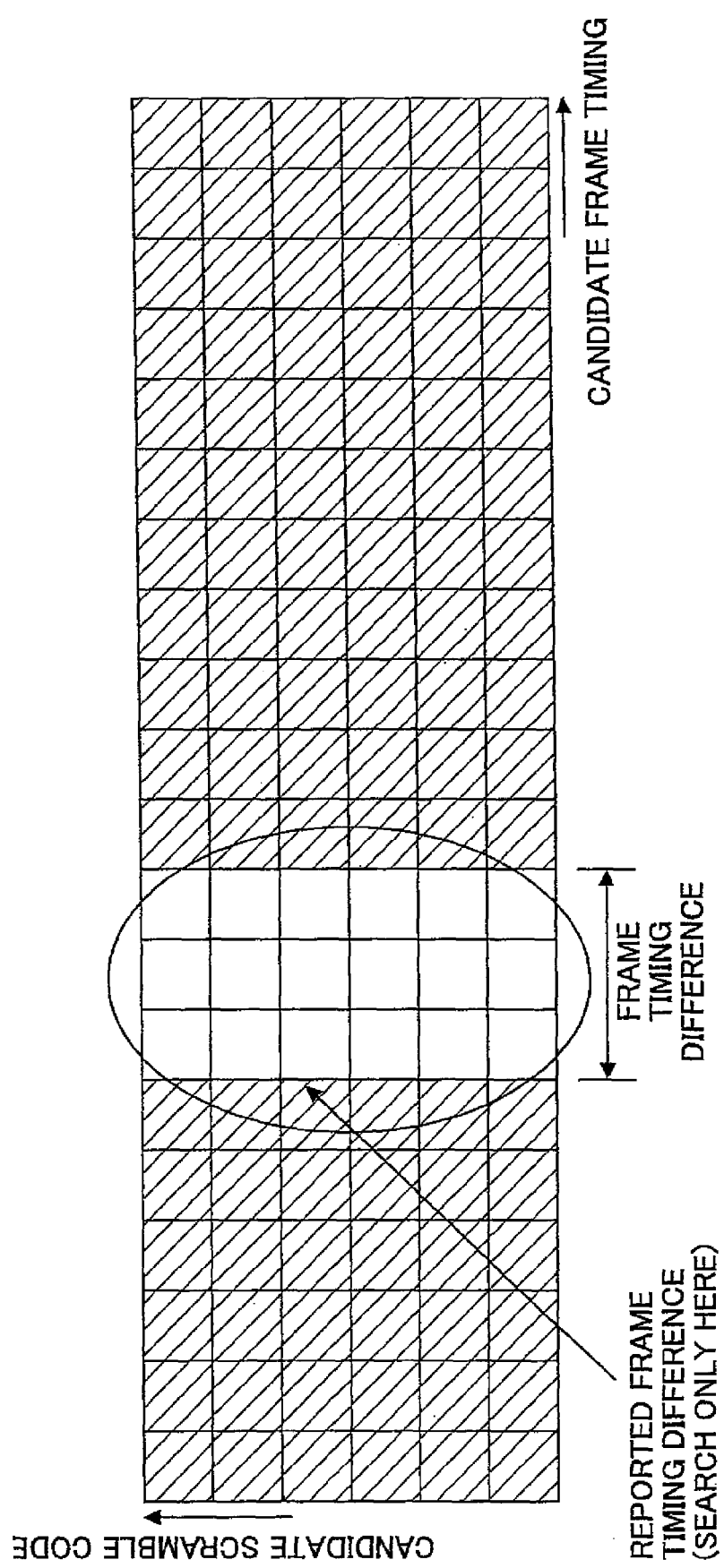
FIG. 8 is a schematic diagram illustrating a search range in a cell search method according to an embodiment of the present invention.
Figure 9:
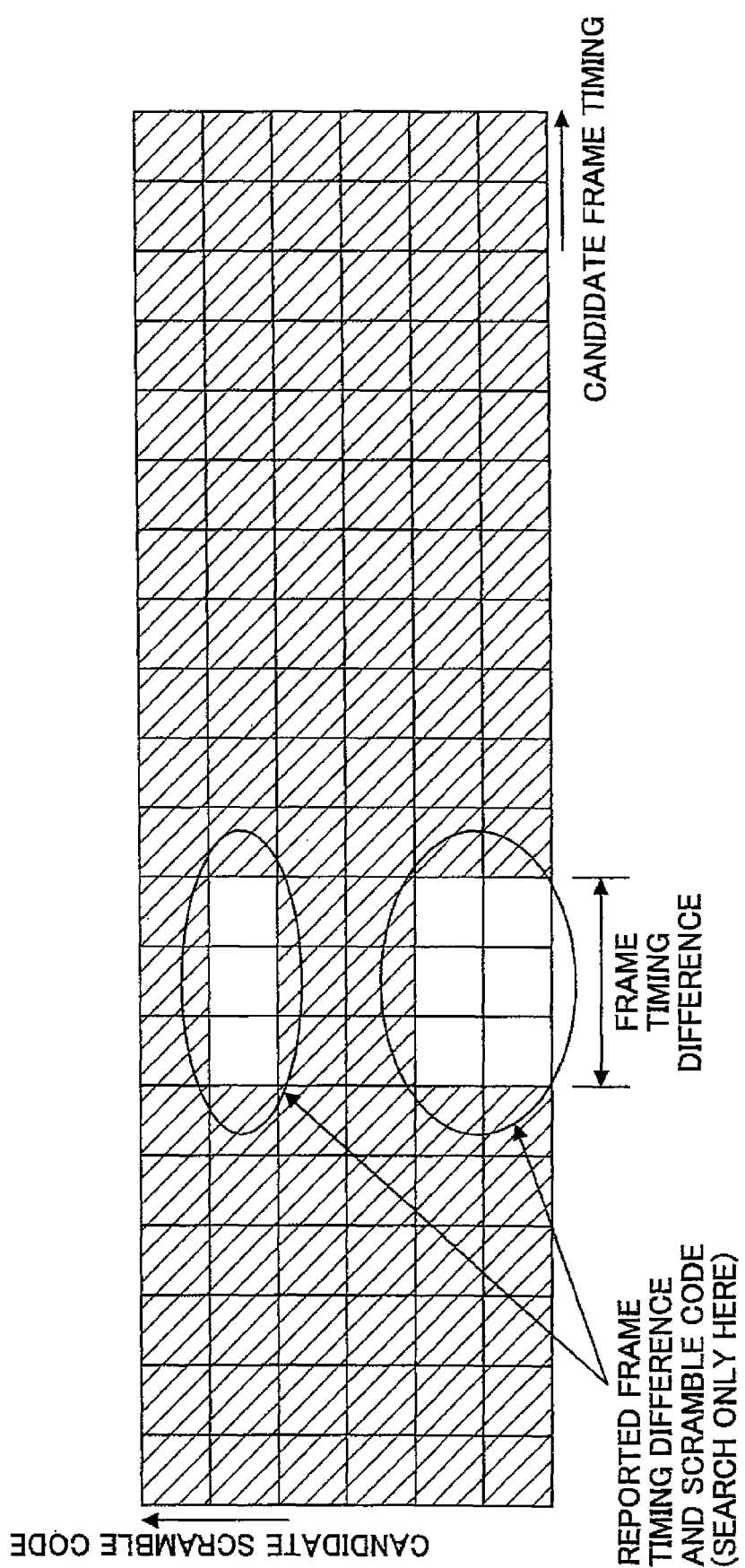
FIG. 9 is a schematic diagram illustrating another search range in a cell search method according to an embodiment of the present invention.

FIGS. 7-9 are schematic diagrams illustrating search ranges in cell search. FIG. 7 schematically illustrates a search range in conventional cell search. FIGS. 8 and 9 schematically illustrate search ranges in cell search according to embodiments of the present invention. In these diagrams, the horizontal axis represents candidate frame timing, and the vertical axis represents candidate scramble codes.

As illustrated in FIG. 7, in conventional cell search, cell search is performed for all frame timings and all scramble codes as candidates. In other words, it is necessary to compute correlation values as many times as (the number ($N_{ft}$) of candidate timings×the number ($N_{cd}$) of candidate (cell-specific) scramble codes) and select the maximum timing and the maximum scramble code. Thus, the cell search requires enormous amounts of computation.

On the other hand, in cell search according to these embodiments, as illustrated in FIGS. 8 and 9, it is possible to significantly reduce the computation amount compared to the conventional operation where the cell search is performed on all the frame timings and all the scramble codes as candidates. FIG. 8 illustrates an exemplary cell search range in a case where only frame timing difference information is reported from a base station to a mobile station. FIG. 9 illustrates an exemplary cell search range in a case where frame timing difference information and neighboring base station scramble codes (=candidate scramble codes) are reported from a base station to a mobile station. In these illustrations, outlined portions correspond to cell search ranges.

As illustrated in FIG. 8, according to the embodiment where only frame timing difference information is reported from a base station, a mobile station detects frame timing and scramble code by searching only the range of the frame timing difference reported. In this embodiment, if the number of candidate frame timings can be reduced to less than 100, for example, by using the frame timing difference information, it is possible to significantly reduce computational complexity for timing detection.

According to this embodiment, it is possible to reduce the computational complexity required for cell search compared to some conventional methods. As a result, the cell search time can be shortened (speeding up), resulting in reduced power consumed during the stand-by mode (battery saving) and longer duration of the stand-by mode.

Also as illustrated in FIG. 9, according to the embodiment where frame timing difference information and neighboring base station scramble codes are reported from a base station to a mobile station, the mobile station detects frame timing, in particular start timing of the scramble codes, by searching only the range of the reported frame timing differences as candidates, and then correlates only the reported candidate scramble codes to identify the scramble code used in the base station.

In other words, if the candidate scramble code information is obtained, the reported candidate scramble codes (ex. dozens of them) only have to be correlated without correlation with all the 512 types of scramble codes. As a result, the search range in cell search is limited compared to the embodiment illustrated in FIG. 8, resulting in a significant reduction in the computational complexity required for the cell search.

In addition, the reduction in the search candidates makes it possible to reduce false positive error probability significantly and detect the optimal cell with high accuracy. As a result, it is possible to prevent an unnecessary increase in transmission power and facilitate large capacity systems.

Second Embodiment

In a second embodiment, a base station has functionality of rendering transmission timing difference information reported to a mobile station more accurately.

It is supposed that a radio communication system of the second embodiment has the same basic configuration as the radio communication system described in conjunction with the first embodiment. So, the corresponding references (with the same last numbers) are assigned to a mobile station, a base station and other components, and the description thereof is omitted. In the following, some features of this embodiment are described.

Figure 10:
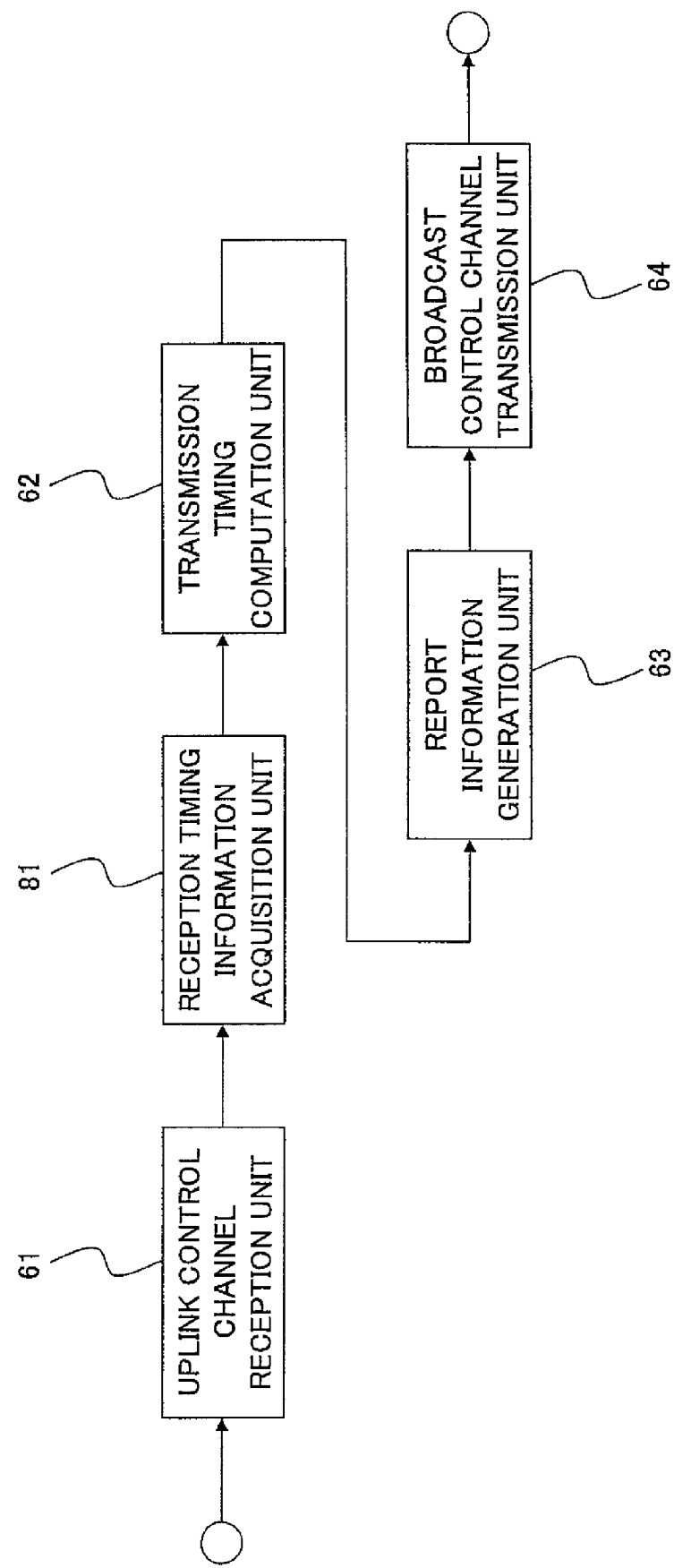
FIG. 10 is a block diagram illustrating an exemplary configuration of a base station according to a second embodiment of the present invention.

FIG. 10 is a block diagram illustrating an exemplary configuration of a base station according to the second embodiment. Compared to the first embodiment, the base station of this embodiment differs in that it includes a reception timing information acquisition unit 81. This reception timing information acquisition unit 81 acquires reception timing difference information transmitted from a large number of mobile stations. A transmission timing computation unit 62 performs some statistical operations such as an averaging operation on the acquired reception timing difference information. In other words, since more accurate reception timing differences between base stations can be detected by performing the averaging operation on the reception timing difference information reported from the many mobile stations, it is possible to compute transmission timing differences between base stations more accurately.

A candidate frame timing reduction unit 72 of a mobile station uses the more accurate transmission timing difference to reduce the number of candidate frame timings under the accurate transmission timing difference. Thus, the target cell candidates for cell search are narrowed accurately, which prevents inappropriate cells from being searched. As a result, faster and more accurate cell search is facilitated.

Third Embodiment

In conjunction with the second embodiment, it has been described that some statistical operations are performed on reception timing difference information reported from a large number of mobile stations for detection of accurate reception timing differences at a base station, and thereby more accurate transmission timing differences are obtained. In conjunction with this embodiment, it is described that location information of mobile stations is used to obtain more accurate transmission timing differences between base stations.

It is supposed that a radio communication system of the third embodiment has the same basic configuration as the radio communication system described in conjunction with the first embodiment. So, the corresponding references (with the same last numbers) are assigned to a mobile station, a base station and other components, and the description thereof is omitted. In the following, some features of this embodiment are described.

Figure 11:
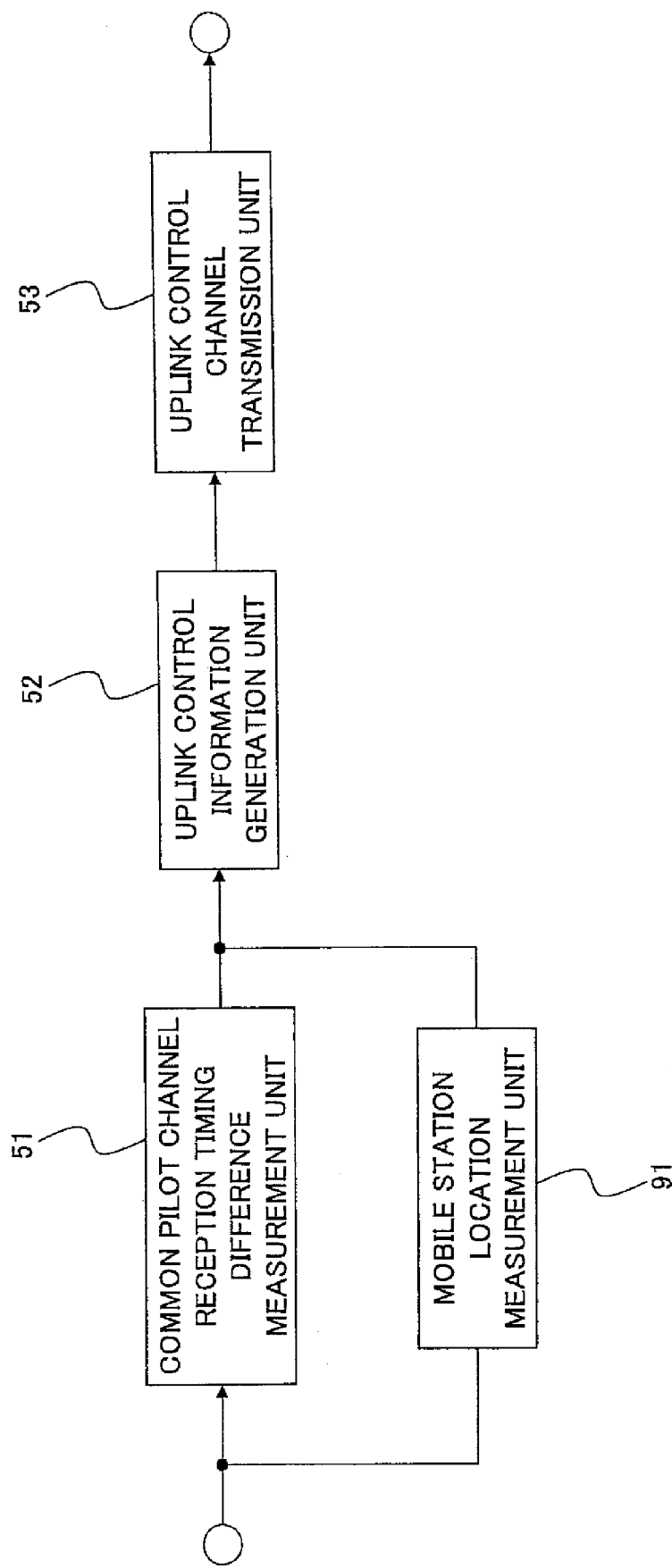
FIG. 11 is a block diagram illustrating an exemplary configuration of a base station according to a third embodiment of the present invention.

FIG. 11 is a block diagram illustrating an exemplary configuration of a mobile station according to the third embodiment. Compared to the first embodiment, a mobile station of this embodiment differs in that it includes a mobile station location measurement unit 91. This mobile station location measurement unit 91 uses a GPS signal or a common pilot channel signal from the base station to measure the location of a mobile station, and supplies the location of the mobile station, that is, measurement location of reception timing, as mobile station location information to an uplink control information generation unit 52. The uplink control information generation unit 52 generates the mobile station location information supplied from the mobile station location measurement unit 91 and reception timing difference information measured at a common pilot channel reception timing difference measurement unit 51 as control information. The uplink control channel transmission unit 53 transmits the generated control information to the base station over a control channel.

A transmission timing computation unit 62 of a base station uses mobile station location information in the control information transmitted from the mobile station to correct propagation delay between the base station and the mobile station ($\Delta T_1$, $\Delta T_2$ (see FIG. 2)). Specifically, the mobile station location information is used to derive the distance between the base station and the mobile station and correct the propagation delay correlated with this distance. In this correction method, a table of precomputed propagation delays correlated with the distance may be used to derive the corrected amount. Alternatively, the corrected amount may be computed without the use of such a table.

According to this embodiment, a base station can obtain accurate transmission timing differences between the base station and some adjacent base stations by correcting propagation delay between the base station and a mobile station. A candidate frame timing reduction unit 72 of the mobile station reduces the number of candidate frame timings under this accurate transmission timing differences information. As a result, the same advantage as the second embodiment, that is, faster and more accurate cell search is achieved.

Fourth Embodiment

In conjunction with the third embodiment, it is described that mobile station location information is used to obtain a more accurate transmission timing difference. In conjunction with this embodiment, it is described that a downlink reception level is used to obtain a more accurate transmission timing difference.

It is supposed that a radio communication system of the fourth embodiment has the same basic configuration as the radio communication system described in conjunction with the first embodiment. So, the corresponding references (with the same last numbers) are assigned to a mobile station, a base station and other components, and the description thereof is omitted. In the following, some features of this embodiment are described with reference to FIGS. 3 and 4.

In FIG. 3, according to this embodiment, a common pilot channel reception timing difference measurement unit 51 of a mobile station measures the reception level of a common pilot channel signal together with reception timing. These information items are generated as control information by an uplink control information generation unit 52, and are transmitted from an uplink control channel transmission unit 53.

In FIG. 4, a transmission timing computation unit 62 of a base station receives the incoming control information, computes the distance between the base station and the mobile station based on the reception level, and corrects propagation delay correlated with the distance. For this correction method, the correction method described in conjunction with the third embodiment may be used.

According to this embodiment, a more accurate transmission timing difference can be obtained by correcting the propagation delay between a base station and a mobile station. A candidate frame timing reduction unit 72 of a mobile station reduces the number of candidate frame timings under this accurate transmission timing difference. As a result, the same advantage as the second embodiment, that is, faster and more accurate cell search is achieved.

In addition, according to this embodiment, the downlink reception level is simply measured and reported to a base station. Thus, compared to the third embodiment, no GPS receiver or other devices are required, and thus an additional advantage of reduced device cost is achieved.

As stated above, according to the embodiments, a mobile station measures reception timing differences of common pilot channel signals transmitted from neighboring base stations, and reports them to a base station. Some exemplary triggers of a mobile station measuring a reception timing difference of a common pilot channel signal are introduced below.

(a) In handover, the mobile station measures reception timing differences of common pilot channel signals between base stations. In general, the measurement of the reception timing differences of common pilot channel signals is essential to the handover operation. Thus, in this case, transmission from a base station of a control signal to cause a reception timing difference of a common pilot channel signal to be measured can be omitted. As a result, it is possible to save radio resources.

(b) At time of installation and resetting of a base station, a control signal to cause reception timing differences of common pilot channel signals to be measured is transmitted from a base station to a mobile station so that the mobile station is caused to measure the reception timing difference. In this case, the control signal is needed. However, if clock timing of the base station is highly accurate, an accurate reception timing difference can be obtained by simply causing the mobile station to measure the reception timing differences first. Thus, the mobile station subsequently does not have to measure the reception timing differences. In other words, it is possible to reduce the processing workload on the mobile station.

In addition, if a base station must be reset due to some reasons such as failure and maintenance of the base station and the reset operation leads to variation of transmission timing of a common pilot channel signal transmitted from the base station, the mobile station may measure the reception timing difference in response to the reset operation.

(c) The control signal to cause the reception timing differences of common pilot channel signals to be transmitted may be periodically transmitted from the base station to the mobile so as to cause the reception timing differences to be measured. In other words, since the reception timing differences are measured and reported to the mobile station periodically, the transmission timing difference can be periodically updated in the base station. As a result, it is possible to obtain accurate transmission timing difference information.

Although the transmission timing difference information is transmitted over a broadcast control channel in these embodiments, the present invention is not limited to the embodiments. For example, if there are a small number of mobile stations within a cell, a user specific dedicated control channel may be used for the reporting. In other words, the transmission timing difference information can be reported with efficient use of radio resources by selecting a broadcast control channel or a dedicated control channel depending on the number of mobile stations within the cell.

This international patent application is based on Japanese Priority Application No. 2005-105497 filed on Mar. 31, 2005, the entire contents of which are hereby incorporated by reference.

The Invention claimed is:

1. A radio communication system including a plurality of base stations and a plurality of mobile stations,
a mobile station including a reception timing difference unit receiving reference signals transmitted from neighboring base stations, measuring a reception timing difference between the reference signals, and reporting the reception timing difference to one or more of the base stations,
a base station including a frame timing difference computation unit and a frame timing difference information report unit, the frame timing difference unit computing a frame timing difference of the reference signals between said base station and the neighboring base stations based on the reception timing difference reported from the mobile station, the frame timing difference information report unit reporting the frame timing difference computed by the frame timing difference computation unit to the mobile station,
the mobile station further including a cell search unit performing cell search,
wherein the cell search comprises computing correlations for each pair of a first set of pairs of candidate timings and candidate scramble codes, the first set of pairs being determined based on the frame timing difference reported from the base station, and determining a pair having a maximum correlation in the first set of pairs.

2. The radio communication system as claimed in claim 1,
the base station further including a scramble code report unit reporting a scramble code of a neighboring base station in the reporting of the frame timing difference to the mobile station,
wherein the cell search comprises computing correlations for each pair of a second set of pairs of candidate timings and candidate scramble codes, the second set of pairs being reduced from the first set of pairs based on the frame timing difference reported from the base station and the scramble code of the neighboring base station, and determining a pair having a maximum correlation in the second set of pairs.

3. The base station as claimed in claim 1, further including:
a reception timing difference measurement unit transmitting a control signal to cause the mobile station to measure the reception timing differences between reference signals of neighboring base stations.

4. A mobile station wirelessly connected to a base station, comprising:
a reception timing difference report unit receiving reference signals transmitted from neighboring base stations, measuring a reception timing difference between the reference signals, and reporting the reception timing difference to one or more base stations; and
a cell search unit performing cell search,
wherein the cell search comprises computing correlations for each pair of a first set of pairs of candidate timings and candidate scramble codes, the first set of pairs being determined based on a frame timing difference transmitted from the base stations, and determining a pair having a maximum correlation in the first set of pairs.

5. The mobile station as claimed in claim 4, wherein the cell search comprises computing correlations for each pair of a second set of pairs of candidate timings and candidate scramble codes, the second set of pairs being reduced from the first set of pairs based on the frame timing difference reported from the base stations and a scramble code of a neighboring base station, and determining a pair having a maximum correlation in the second set of pairs.

6. A radio communication method for use in a radio communication system including a plurality of base stations and a plurality of mobile stations, the method comprising the steps of:
a mobile station receiving reference signals from neighboring base stations, measuring a reception timing difference between the reference signals, and reporting the reception timing difference to one or more base stations;

a base station computing a frame timing difference of the reference signals between the base station and the neighboring base stations based on the reception timing difference reported from the mobile station and reporting the computed frame timing difference to the mobile station; and the mobile station performing cell search, wherein the cell search comprises computing correlations for each pair of a first set of pairs of candidate timings and candidate scramble codes, the first set of pairs being determined based on the frame timing difference reported from the base station, and determining a pair having a maximum correlation in the first set of pairs.

* * * * *